United States Patent
Elledge

[11] Patent Number: 5,840,201
[45] Date of Patent: Nov. 24, 1998

[54] METHOD FOR FORMING SPACERS IN FLAT PANEL DISPLAYS USING PHOTO-ETCHING

[75] Inventor: Jason B. Elledge, Meridian, Id.

[73] Assignee: Micron Display Technology, Inc., Boise, Id.

[21] Appl. No.: 846,018

[22] Filed: Apr. 25, 1997

Related U.S. Application Data

[62] Division of Ser. No. 587,732, Jan. 19, 1996, Pat. No. 5,705,079.

[51] Int. Cl.⁶ .................................................. B44C 1/22
[52] U.S. Cl. ................................ 216/24; 216/33; 216/55; 216/66; 313/311; 445/24
[58] Field of Search .................... 216/23, 24, 25, 216/33, 36, 39, 55, 62, 66, 80; 445/24; 313/309, 311, 351

[56] References Cited

U.S. PATENT DOCUMENTS

| | | | |
|---|---|---|---|
| 3,424,909 | 1/1969 | Rougeot | 250/207 |
| 3,979,621 | 9/1976 | Yates | 313/105 CM |
| 3,990,874 | 11/1976 | Schulman | 65/4 B |
| 4,091,305 | 5/1978 | Poley et al. | 313/220 |
| 4,183,125 | 1/1980 | Meyer et al. | 29/25.15 |
| 4,451,759 | 5/1984 | Heynisch | 313/495 |
| 4,705,205 | 11/1987 | Allen et al. | 228/180.2 |
| 4,923,421 | 5/1990 | Brodie et al. | 44/24 |
| 4,940,916 | 7/1990 | Borel et al. | 313/306 |
| 5,070,282 | 12/1991 | Epsztein | 315/383 |
| 5,136,764 | 8/1992 | Vasquez | 29/25.01 |
| 5,151,061 | 9/1992 | Sandhu | 445/24 |
| 5,205,770 | 4/1993 | Lowrey et al. | 445/24 |
| 5,229,691 | 7/1993 | Shichao et al. | 315/366 |
| 5,232,549 | 8/1993 | Cathey et al. | 456/633 |
| 5,324,602 | 6/1994 | Inada et al. | 430/23 |
| 5,329,207 | 7/1994 | Cathey et al. | 315/169.1 |
| 5,342,477 | 8/1994 | Cathey | 156/643 |
| 5,342,737 | 8/1994 | Georger, Jr. et al. | 430/324 |
| 5,347,292 | 9/1994 | Ge et al. | 345/74 |
| 5,371,433 | 12/1994 | Home et al. | 313/495 |
| 5,374,868 | 12/1994 | Tjaden et al. | 313/310 |
| 5,391,259 | 2/1995 | Cathey et al. | 156/643 |
| 5,413,513 | 5/1995 | Home et al. | 445/24 |
| 5,427,648 | 6/1995 | Pamulapati et al. | 216/24 |
| 5,445,550 | 8/1995 | Xie et al. | 445/24 |
| 5,448,131 | 9/1995 | Taylor et al. | 313/309 |
| 5,449,970 | 9/1995 | Kumar et al. | 313/495 |
| 5,486,126 | 1/1996 | Cathey et al. | 445/25 |
| 5,492,234 | 2/1996 | Fox | 216/25 |

FOREIGN PATENT DOCUMENTS

| | | |
|---|---|---|
| 690472 A1 | 1/1996 | European Pat. Off. . |
| 2-165540(A) | 6/1990 | Japan . |
| 3-179630(A) | 8/1991 | Japan . |

*Primary Examiner*—William Powell
*Attorney, Agent, or Firm*—Hale and Dorr LLP

[57] ABSTRACT

Photoetchable glass is used to form spacer elements for large area field emission displays. Frit dots are placed onto a substrate. A sheet of photo etchable glass is exposed to UV light using a mask such that the UV light exposes the etchable areas and does not expose the areas which will form the spacers. The etchable glass is then heat treated to crystallize the UV exposed areas and to tailor the coefficient of thermal expansion. Next the glass is adhered to the frit coated substrate and the UV exposed areas etched away leaving spacers adhered to frit dots.

16 Claims, 4 Drawing Sheets

METHOD FOR FORMING SPACERS IN FLAT PANEL DISPLAYS USING PHOTO-ETCHING

This application is a divisional of application Ser. No. 08/587,732 filed on Jan. 19, 1996, now U.S. Pat. No. 5,705,079.

GOVERNMENT RIGHTS

This invention was made with Government support under Contract No. DABT63-93-C-0025 awarded by the Advanced Research Projects Agency (ARPA). The Government has certain rights in this invention.

BACKGROUND OF THE INVENTION

The present invention pertains to a method for forming spacers for flat panel displays and, in particular, to a photo-etchable method for making small sectional area spacers attached to a substrate.

Flat or thin field emission (cold cathode) displays have an evacuated cavity (typically at less than $10^{-6}$ Torr) between the cathode electron emitting surface (also referred to as a base electrode, baseplate, emitter surface, or cathode surface) and its corresponding anode display screen (also referred to as an anode, cathodoluminescent screen, display face, faceplate, or display electrode). A complete discussion of such devices may be found in U.S. Pat. No. 4,940,916, the disclosure of which is incorporated herein by reference. It is very important for the cathode and anode to be substantially uniformly parallel spaced across their entire surfaces in order to have proper operation.

A relatively high voltage differential (e.g., generally above 300 volts) is maintained between the cathode emitting surface and the display screen of a field emission display. It is important to prevent catastrophic electrical breakdown between the electron emitting surface and the anode screen by maintaining this substantially uniform spacing and to do this without introducing any structure which might contribute to arcing or out gassing. At the same time, this narrow spacing between the cathode and anode is necessary to maintain the desired structural thinness, which is characteristic of field emission displays. The spacing also has to be substantially uniform for constant high image resolution and brightness, as well as to avoid display distortion, etc.

Small area flat displays (e.g., those which have an approximately 1" diagonal) generally do not require spacers, since glass having a thickness of approximately 0.040" will not bow significantly and thus does not cause concern. However, as the display area increases, spacer supports become more important. For example, a flat display having a 30" diagonal measurement will have substantial force exerted on it by atmospheric pressure. While this force is no greater than that applied to, for example, cathode ray tubes, the geometry of the FED is such that, in order to meet the thickness requirements, the cathode and anode must be made from thin plates which are subject to bowing. Since an FED is far less tolerant to bending or bowing than a CRT, spacers play an important role in maintaining both the structural integrity and substantially uniform parallel spacing between the plates across large area, light weight, flat panel displays.

Spacers are incorporated between the faceplate and the plate upon which the emitter tips are fabricated. The spacers maintain the desired separation between the thin, light-weight substrates allowing the display area to be increased with little or no increase in either substrate thickness or overall thickness of the display.

Spacers must conform to certain parameters. The spacers must: 1) be sufficiently non-conductive to prevent catastrophic electrical breakdown between the cathode array and the anode, in spite of the relatively close inter-electrode spacing (which may be on the order of 200 μm), and relatively high inter-electrode voltage differential (which may be on the order of 300 volts or more); 2) exhibit mechanical strength such that they prevent the faceplate and backplate of the flat panel display from coming together; 3) exhibit stability under electron bombardment, since electrons will be generated at each of the pixels; 4) be capable of withstanding "bakeout" temperatures of around 400° C. that are encountered in creating the high vacuum between the faceplate and backplate of the display; and 5) be small enough in cross section as to not to interfere with display orientation or pixel size.

There are several drawbacks to the current spacers and the methods of applying them. Methods employing screen printing, stencil printing, or the like suffer from the inability to provide a spacer having a sufficiently high aspect ratio. The spacers formed by these methods easily can be either too short for the high voltages (allowing arcing), or too wide (interfering with the display image). Forming spacers by reactive ion etching and plasma etching of deposited materials suffer from slow throughput (i.e., time of fabrication), slow etch rates, and etch mask degradation. Lithographically defined photoactive organic compounds result in the formation of spacers which are not compatible with the high vacuum conditions or elevated temperature characteristics in the manufacture of field emission displays.

One prior art method for making spacer members of about 15 mils in height for large area field emission displays starts with a substrate coated with a conductive film. A pattern of photoresist is put onto the conductive film and frit is electrophoritically deposited into the holes in the photoresist. This creates a pattern of frit dots on the conductive layer. Next a thin sheet (spacer sheet) is placed on top of the frit dots. This thin spacer sheet is made of a plurality of parallel core glass rods, of small diameter, in a matrix of cladding glass that both binds the core glass into the spacer sheet and is etchable. The entire assembly of conductive film, frit dots and spacer sheet is baked in the furnace to make the frit dots melt and adhere the core glass in the spacer sheet to the substrate. The photoresist burns off at about 300° C. After cooling, the cladding matrix of the spacer sheet is etched away by appropriate means, such as an acid, leaving standing rods of core glass substantially perpendicular to the substrate and adhered thereto by the frit dots. Spacers are discussed in U.S. Pat. Nos. 4,923,421; 5,205,770; and 5,232,549, the disclosures of which are incorporated herein by reference.

SUMMARY OF THE INVENTION

The present invention utilizes a photoetchable glass to form spacer elements for large area field emission displays. Frit dots are placed onto a substrate and a sheet of photo etchable glass is exposed to UV light using a mask such that the UV light exposes the etchable areas of the glass and does not expose these areas which will form the spacers. The etchable glass is then heat treated to crystallize the UV exposed areas and to tailor the coefficient of thermal expansion of the glass. Next the exposed and treated glass is adhered to the frit coated substrate and the UV exposed areas etched away leaving spacers adhered to frit dots.

BRIEF DESCRIPTION OF THE DRAWINGS

The present invention will now be described, by way of example, with reference to the accompanying drawings in which.

DETAILED DESCRIPTION OF AN OPERATIVE EMBODIMENT

Figure 1:
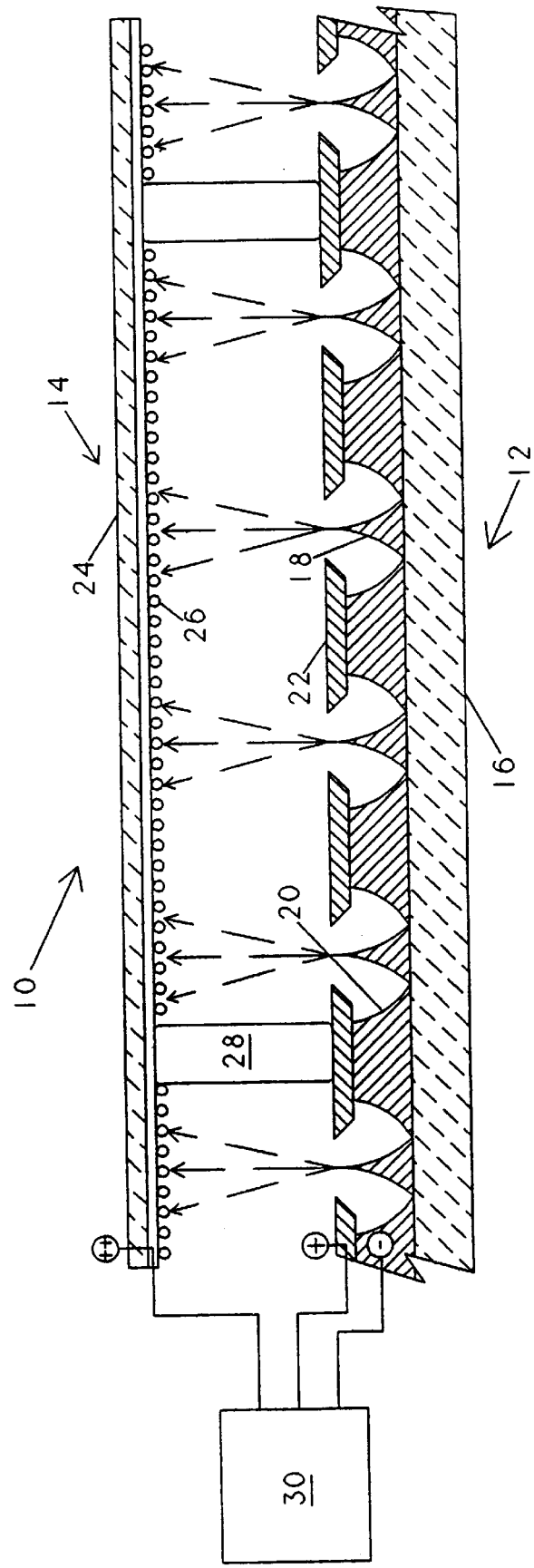
FIG. 1 is a schematic section through a representative field emission display.
Figure 2:
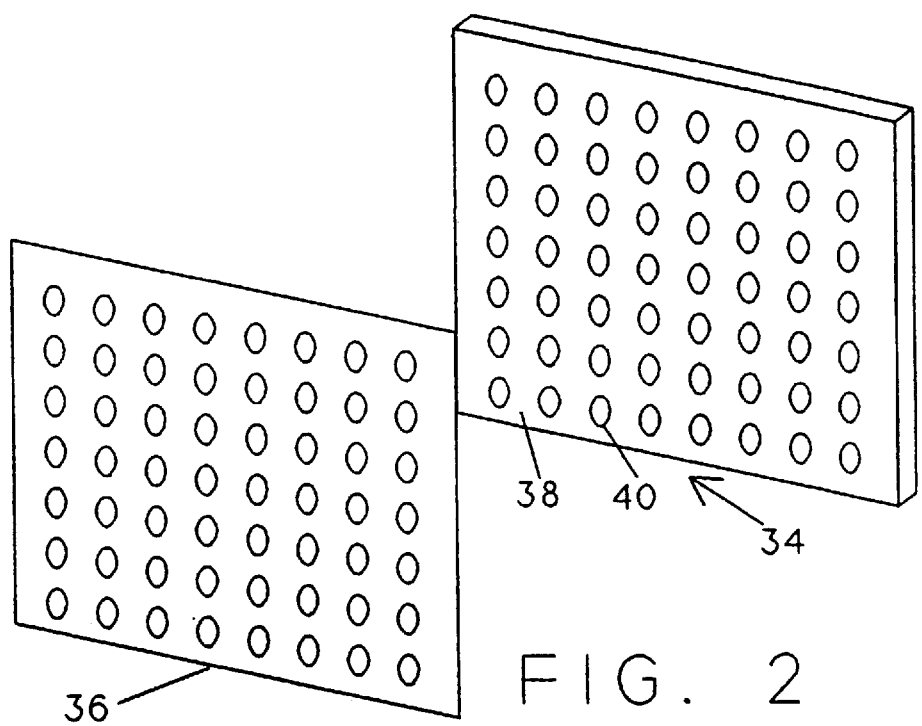
FIG. 2 is a perspective view of the exposure step.
Figure 3:
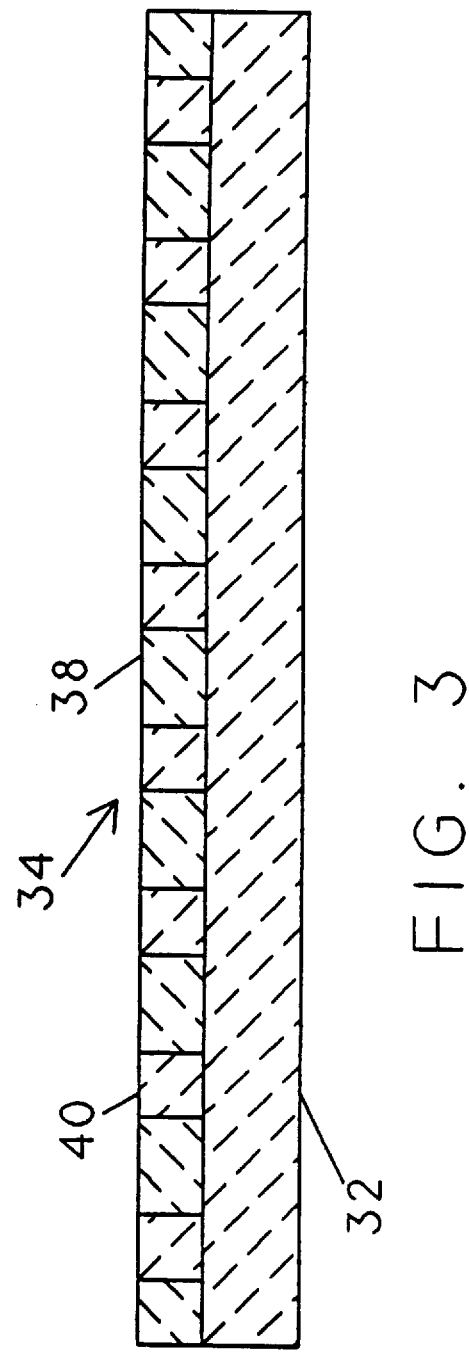
FIG. 3 is a side elevation of the glass on a substrate prior to etching.
Figure 4:
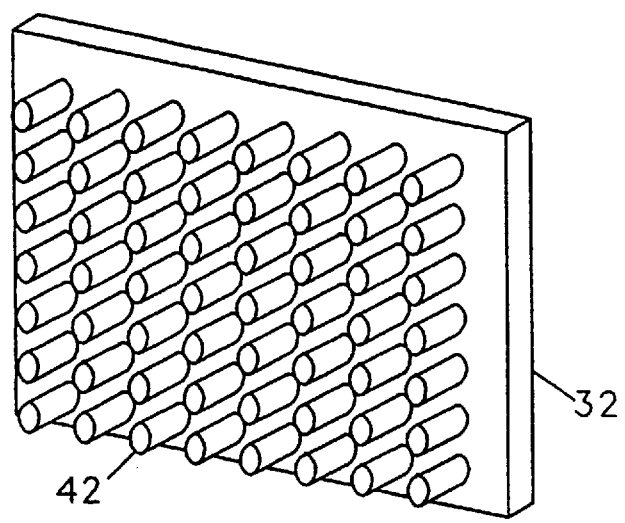
FIG. 4 is a perspective view of a substrate with spacers.

FIG. 1 shows a representative section through a field emission display 10 having an electron emitting cathode 12 and an anode 14. The cathode is formed from a substrate 16 with a plurality of emitter sites 18 formed thereon in spaced patterned array. The emitter sites 18 are surrounded by a dielectric layer 20 and a grid 22 overlies the dielectric layer 20 and exposes the emitter sites 18. The anode 24 is provided with a phosphor coating 26 and the plates are spaced by a plurality of spacer members 28. The cathode, anode and grid are connected to source 30.

The present invention replaces the above described system utilizing a bundle array of a plurality of clad glass rods with a photoetchable glass. As before, a patterned array of frit dots (not shown) is placed onto a substrate 32. The subject method then exposes a thin sheet of photoetchable glass 34 to ultraviolet (UV) light, using a mask 36 such that the UV light exposes only the etchable areas 38 and does not expose the areas 40 which will form the spacers 42. The exposed glass sheet is then heat treated to crystallize the UV exposed areas 38 and to tailor the coefficient of thermal expansion. Next the exposed and treated glass sheet 34 is adhered to the frit coated substrate 38 in conventional fashion with the areas 40 overlying the frit dots. Then the UV exposed areas 38 of the glass sheet 34 are etched, with conventional etchants, leaving spacers 42 adhered to respective frit dots and extending substantially perpendicular to the surface of the substrate 32.

The ideal would be to produce fairly uniform and symmetrical spacers 42, which are shown as being substantially cylindrical in shape for convenience only. However, due to the etching process, it is more likely that the spacers would have more of a truncated conical configuration. This should not prove to be any disadvantage since the ratio of the length to diameter of the spacers is such that the expected taper would not be great enough to prove to be disadvantageous. The present invention enables making fairly uniform symmetrical spacers having a length of from 5 mils to 25 mils and a cross sectional area of from 0.5 mils to 2 mils.

The photoetchable glass is preferably a photosensitive amorphous glass of the type formed by adding a metallic ion and sensitizer to a silicate glass. Such glass, when exposed to ultraviolet light and heat treated, produces a metal colloid with crystalline nuclei. The crystal structure is extremely fine making the glass easily dissolvable in acid. This also allows for the etching of finely defined structures. Examples of such glass are "FOTURAN" made by the Optical Division of Schott Glaswerke of Mainz, Germany and PEG3 made by the Optical Division of by Hoya Corporation of Tokyo, Japan.

The preferred etchant for the present invention is hydrofluoric acid (HF).

The above noted glass is preferably heat treated at a temperature in the range of from 500° to 600° C. for from 45 to 80 minutes. The adhering of the frit accomplished at temperatures in the range of from 480° C. to 525° C. for time periods from 36 hours at the lower temperatures to 2 hours at the higher temperatures.

The present invention may be subject to many modifications and changes without departing from the spirit or essential, characteristics thereof. The present embodiment should therefor be considered in all respects as being illustrative and not restrictive of the scope of the invention as defined by the appended claims.

I claim:

1. A plurality of spacer elements for large area field emission displays formed by the process of:
    forming a number of adhesive areas on a substrate:
    providing a sheet of photo etchable material on the substrate;
    exposing the sheet to light through a mask such that the exposure defines areas which will form spacers and areas to be later removed;
    adhering the areas of the sheet which will form spacers to the adhesive areas on the substrate; and
    removing the areas to be removed, thereby leaving spacers adhered to the substrate at the adhesive areas.

2. Spacer elements according to claim 1 wherein said material is a photosensitive glass formed by adding a metallic ion and sensitizer to silicate glass.

3. Spacer elements according to claim 2 wherein said photosensitive glass is exposed to ultraviolet light and heat treated to produce metal colloid with crystalline nuclei of extremely fine structure making the glass easily dissolvable in acid and etching of finely defined structures.

4. Spacer elements according to claim 1 wherein the removing step includes etching with hydrofluoric acid.

5. Spacer elements according to claim 1 wherein said glass is heat treated with a temperature in the range of from 500° C. to 600° C. for a time between 45 and 80 minutes.

6. Spacer elements according to claim 1 wherein the adhesive areas are formed from frit said step of adhering to the frit includes heating to temperatures in the range of 480° C. to 525° C., for a time period of 2 hours to 36 hours.

7. Spacer elements according to claim 1 wherein the spacers have a length between 125 to 625 microns and a diameter between 12.5 and 50 microns.

8. Spacer elements according to claim 1 wherein said spacers have a substantially truncated conical configuration.

9. An apparatus comprising:
    a substrate having adhesive areas formed thereon; and
    a sheet of photoetchable glass formed over the glass substrate and treated to have relatively etchable areas and relatively non-etchable areas, the non-etchable areas being over the adhesive areas and having cross-sectional dimensions suitable for use as spacer elements in a field emission display device, such that when the etchable areas are removed, spacer elements will remain bonded to the substrate at the adhesive areas.

10. The apparatus of claim 9, wherein the photoetchable glass is a silicate glass with a metallic ion and sensitizer.

11. The apparatus of claim 9, wherein the photoetchable glass sheet has a thickness between 125 and 625 microns, and wherein the non-etchable areas have a diameter between 12.5 and 50 microns.

12. The apparatus of claim 9, wherein the adhesive areas are dots of frit.

13. The apparatus of claim 9, wherein the etchable areas are treated to have metal colloid with crystalline nuclei of fine structures such that the photoetchable glass is dissolvable in acid.

14. A field emission display comprising:
    an anode and a cathode;
    one of the anode and the cathode having adhesive areas formed thereon; and a number of spacers bonded to the adhesive areas, the spacers comprising photoetchable glass.

15. The field emission display of claim 14, wherein the adhesive areas are dots of frit.

16. The field emission display of claim 14, wherein the photoetchable glass is a silicate glass with a metallic ion and sensitizer.

* * * * *